United States Patent
Wong et al.

(10) Patent No.: US 9,405,181 B2
(45) Date of Patent: Aug. 2, 2016

(54) PROJECTION ASSEMBLIES FOR USE WITH UNMANNED AERIAL VEHICLES

(71) Applicant: DISNEY ENTERPRISES, INC., Burbank, CA (US)

(72) Inventors: Clifford W. Wong, Los Angeles, CA (US); Michael J. Ilardi, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 167 days.

(21) Appl. No.: 14/448,777

(22) Filed: Jul. 31, 2014

(65) Prior Publication Data

US 2016/0033855 A1    Feb. 4, 2016

(51) Int. Cl.
| | |
|---|---|
| *G03B 21/56* | (2006.01) |
| *G03B 37/00* | (2006.01) |
| *G03B 21/10* | (2006.01) |
| *G03B 21/62* | (2014.01) |
| *G03B 21/28* | (2006.01) |

(52) U.S. Cl.
CPC ............... *G03B 21/56* (2013.01); *G03B 21/10* (2013.01); *G03B 21/28* (2013.01); *G03B 21/562* (2013.01); *G03B 21/565* (2013.01); *G03B 21/567* (2013.01); *G03B 21/62* (2013.01); *G03B 37/00* (2013.01); *B64C 2201/00* (2013.01); *B64C 2201/123* (2013.01)

(58) Field of Classification Search
CPC ............ B64C 2201/00; B64C 2201/02; B64C 2201/022; B64C 2201/024; B64C 2201/088; B64C 2201/102; B64C 2201/108; B64C 2201/123; B64C 2201/126; B64C 2201/127; G03B 21/56; G03B 21/565; G03B 21/567; G03B 21/58; G03B 21/62; G03B 21/64; G03B 21/585

See application file for complete search history.

(56) References Cited

U.S. PATENT DOCUMENTS

| | | | | |
|---|---|---|---|---|
| 2,299,682 | A * | 10/1942 | Conant | G02B 13/08 116/DIG. 15 |
| 2008/0211972 | A1* | 9/2008 | Congard | G03B 21/56 348/744 |
| 2014/0233099 | A1* | 8/2014 | Stark | G09F 21/06 359/446 |
| 2014/0236388 | A1* | 8/2014 | Wong | B64C 39/024 701/2 |

* cited by examiner

*Primary Examiner* — Sultan Chowdhury
*Assistant Examiner* — Magda Cruz
(74) *Attorney, Agent, or Firm* — Marsh Fischmann & Breyfogle LLP; Kent A. Lembke (57) ABSTRACT

A projection assembly for use with an unmanned aerial vehicle (UAV) such as quadrotors. The projection assembly includes a projection screen with a rear surface and a front surface, and the projection screen has a level of opacity and/or other physical qualities that enables it to function as a rear-projection surface. The projection assembly includes a vehicle attachment member adapted for coupling with a frame of the UAV, and the projection screen is supported at a first end by the vehicle attachment member. The apparatus includes a projector projecting light, and the projected light is directed onto the rear surface of the projection surface to generate a displayed image visible on the front surface. The projection screen can be formed from a mesh sheet with a porosity allowing air to flow through the projection screen. The mesh sheet may be formed of plastic threads that provide the rear-projection surface function.

20 Claims, 4 Drawing Sheets

PROJECTION ASSEMBLIES FOR USE WITH UNMANNED AERIAL VEHICLES

BACKGROUND

1. Field of the Description

The present invention relates, in general, to aerial displays using unmanned aerial vehicles (UAVs) (also labeled "unmanned drones") such as multicopters, and, more particularly, to a projection assembly for use with UAVs to provide an aerial display with floating or flying projection screens or displays with still or video images.

2. Relevant Background

For many years, there has been continued interest in creating new ways to project light and imagery and to otherwise provide aerial displays. In many settings, a laser lighting display or laser light show may be used to entertain an audience using laser light. The projected laser light or laser beams may be set to or synchronized to music. Laser light has proven useful in indoor and outdoor settings because the coherent nature of laser light allows a narrow beam to be produced that can then be used with optical scanning to draw or project patterns or images on walls, ceilings, or other surfaces including theatrical smoke and fog without refocusing as is common with video projection.

More recently, it has become popular to create outdoor light shows or displays using buildings as projection surfaces. For example, a Symphony of Lights is a synchronized light and laser multimedia display that uses the exterior surfaces of forty-four buildings on both sides of the Victoria Harbor of Hong Kong for projection surfaces to create imagery that is accompanied by music. This large scale display has attracted over 4 million visitors and is held every night for over ten minutes. The show includes flashes of laser lights and projected color patterns along with sweeping search lights/projection lighting as well as stationary lights provided on the buildings themselves (e.g., light emitting diodes (LEDs)).

Unmanned drones or unmanned aerial vehicles (UAVs), such as multicopters including quadrotors, have been used to provide an illuminated light show in the sky. As regulations concerning use of UAVs change, it is likely the commercial use of UAVs will rapidly expand. However, the amount of information that can be displayed and the kinds of visual effects that have been achieved to date has been very limited. As a result, there remains a need for new technologies for generating aerial displays such as a display using unmanned drones to provide light-based displays and/or still or video images in an air space above an audience of spectators.

SUMMARY

Briefly, the inventors have developed projection (or display) assemblies for use with unmanned aerial vehicles (UAVs) (or "unmanned drones") such as multicopters (e.g., quadrotors or the like). Each embodiment of the projection assembly is configured to provide a way of radically expanding the palette of the aerial display or show designer to include all manner of imagery and effects. In addition to pure entertainment uses, the projection assembly opens new frontiers for aerial advertising capabilities and for other applications such as rapid dissemination of emergency information to large numbers of people and over larger geographic areas.

Briefly, the projection assembly is configured as a specially designed payload for a small, unmanned drone such as a quadrotor. As part of designing such a payload, the inventors gave careful consideration to the weight and aerodynamics of the projection assembly. The projection assembly includes a projector projecting a still or video image, a rear projection (RP) screen adapted for flight (e.g., a sheet of porous material such as polypropylene mesh chosen to allow adequate airflow through the sheet while also having adequate opaqueness to function as an RP screen), and a reflector (e.g., a wide angle reflector such as a parabolic mirror) reflecting light from the projector onto the "rear" surface of the RP screen to generate a displayed image.

In one exemplary implementation, the projection assembly included a cylindrical RP screen (or surface) made of a mesh material chosen for its light weight and its ability to allow air to flow through the material. The cylindrical RP screen was adapted for mounting or affixing to the underside of the unmanned drone, e.g., with the centerline of the cylindrically-shaped RP screen extending through the center of the unmanned drone (such as to extend centrally through a multicopter's rotors). A small, lightweight pico-projector was used as the projector of the assembly. To prevent or minimize weight imbalance, the pico-projector was centered underneath the unmanned drone such as with a mounting proximate to the drone's central frame or body (e.g., with its output lens(es) facing generally downward away from the drone) or on a frame at a lower portion of the RP screen (e.g., output lens(es) facing generally upward toward the drone).

The projector was aligned so that its output light (still and/or video images) was aimed at a wide angle reflector that was affixed to one side of the cylindrical RP screen to first strike a rear side of a portion of the mesh material providing the RP screen. In some embodiments, diopters are included to correct focus in the optical assembly (projector output lens (es) and reflector). When the optical assembly was aligned during prototype testing, the projection assembly worked to effectively cover, with a single projector, 180 up to about 270 to 300 degrees of the rear (or inner) surface of the mesh sheet that is providing the cylindrical RP screen.

More particularly, a projection apparatus or assembly is provided for use with an unmanned aerial vehicle (UAV) such as a quadrotor or the like. The projection assembly includes a projection screen with a rear surface and a front surface, and the projection screen has a level of opacity and/or other physical qualities that enables it to function as a rear-projection surface. The projection assembly also includes a vehicle attachment member adapted for coupling with a frame of the UAV, and the projection screen is supported at a first end by the vehicle attachment member and extends a distance (e.g., a screen height) from the first end to a second end spaced apart from the frame of the UAV (e.g., the screen hangs down or is suspended from the UAV during its flight with the projection assembly as its payload). The apparatus further includes a projector (e.g., a pico projector or the like) projecting light associated with still or video images, and the projected light is directed onto the rear surface of the projection surface to generate a displayed image visible on the front surface of the projection screen.

In some embodiments, the projection screen is formed from a mesh or porous sheet with a porosity allowing air to flow through the projection screen. For example, the mesh sheet may be configured to have an open space of at least about 40 percent or an open space in the range of 40 to 60 percent. In such embodiments, the mesh sheet may be formed of translucent-to-opaque plastic threads or wires (e.g., white, gray, or other-colored plastic threads) that provide the rear-projection surface function of the projection screen. These plastic threads or wires may have a diameter in the range of 400 to 600 microns.

The projection assembly may further include a wide angle reflector that is spaced apart from the projector, and the projected light is focused onto the wide angle reflector (not direction directed onto the rear surface). The wide angle reflector reflects light onto the rear surface of the projection surface. In some cases, the projection screen is shaped to provide one or more sidewalls enclosing a space (e.g., a tubular shape, a spherical space, and the like) with the rear surface of the projection screen facing inward into the space, and the projector and the wide angle reflector are supported within the space. In one particular implementation, the space has a cylindrical shape, and the reflected light from the wide angle reflector strikes at least 180 degrees of the rear surface such as within the range of 180 to 300 degrees (e.g., along about 180 to 300 degrees of the circumference of the cylindrically-shaped rear surface of the projection screen).

In some cases, the reflector is a parabolic mirror spaced apart from the projector. In such cases, the projector may be supported and/or positioned: (1) such that the projected light is directed toward the UAV with the reflector disposed between the projector and the UAV; (2) such that the projected light is directed away from the UAV with the reflector placed on a reflector support element affixed to the second end of the projection screen; or (3) such that the projected light follows a trajectory that is transverse to a center line of the cylindrically-shaped space with the reflector positioned proximate to the rear surface of the projection screen.

DETAILED DESCRIPTION

Briefly, the present description is directed toward a projection assembly for use with unmanned drones or unmanned aerial vehicles (UAVs) such as multicopters (e.g., quadrotors or the like). The projection assembly design taught herein is configured to be lightweight and aerodynamic to facilitate its use with UAVs, which typically have limited payload capacities and flight times that are limited and reduced with heavier payloads. Prior to turning to particular implementations, the description begins with a more general description of the components of a projection assembly that allow visual displays to be provided in the sky (or space) above a group of spectators.

Figure 1:
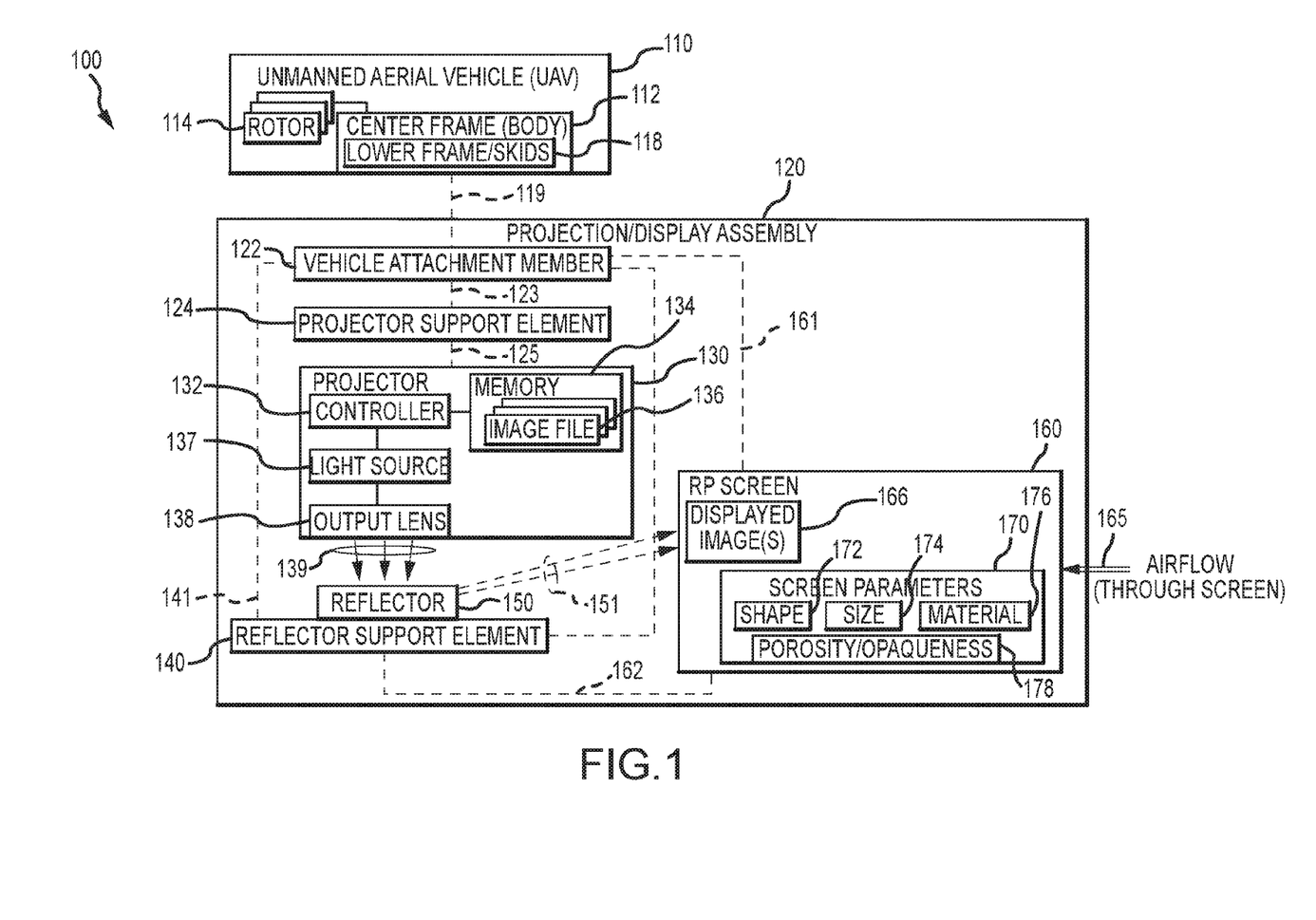
FIG. 1 is functional block diagram of a projection assembly being used to provide a displayed image while supported by and flown with a UAV as described herein.

FIG. 1 illustrates a functional block diagram or schematic of an aerial display system 100 that includes an unmanned aerial vehicle (UAV) 110 that is supporting, as shown at 119, a projection assembly 120. The UAV 110 may be operated to fly in a controlled manner about an airspace, and such remote or onboard control over UAVs such as quadrotors is well-known and, hence, is not discussed in detail here. The UAV 110 includes one, two, or more rotors 114 that are rotated to move the UAV 110 through an airspace, and the rotors 114 are connected to a center frame/body 112 (which typically includes batteries, communication devices, and controllers that guide the movement and operation of the UAV 110 including the rotors 114). The UAV 110 also includes a lower frame or landing skids 118 at or extending from a lower portion of the center frame/body 112, and the projection assembly 120 is connected as shown at 119 to the center frame/body 112 such as through mounting to the lower frame/skids 118.

The projection or display assembly 120 is shown to include a vehicle attachment member 122 that mates as shown at 119 with the lower frame/skids 118 of the UAV 110 such that the projection assembly 120 moves or flies with the UAV 110 during operation of the system 100. A projector support element 124 is coupled as shown at 123 with the vehicle attachment member 122, and a projector 130 is affixed to the support element 124. Typically, it is preferable to choose a small and lightweight projector to minimize the payload presented by the assembly 120, and, in this regard, the projector 130 may take the form of a pico projector or the like. Further, though, it is desirable for the projector 130 to have relatively high output capacity or brightness to achieve a desirable displayed image 166 (e.g., 80 to 300 lumens or more may be useful with a pico projector). Also, it is desirable that the projector 130 be chosen to have a battery life that at least matches the flying time planned for or available with the UAV 110, while limiting weight needed to carry the projector 130.

The projector 130 includes a controller 132 that operates to retrieve and play digital image files 136 in local memory 134 (or may receive wireless transmission of image files to play). The digital image files 136 may include still images or video images of one or more colors. The controller 132 acts to project or output light 139 with light source 137 via output lens 138. The assembly 120 further includes a reflector 150 that is affixed to or mounted upon a reflector support element 140. In turn, the reflector support element 140 is supported in the assembly 120 with the vehicle attachment member 122 directly as shown at 141 or via other assembly components such as the RP screen 160 as shown with lines 161 and 162 (e.g., the RP screen 160 may extend between the vehicle attachment member 122 and the reflector support element/base frame 140 in some embodiments).

As shown, the projector output 138 is focused onto or targeted towards a surface of the reflector 150 while some embodiments may eliminate the reflector 150 and direct the light 139 directly onto the RP screen 160. In the embodiment illustrated in FIG. 1, the projected or output light 139 from the projector 130 strikes the surface of the reflector 150. The reflector 150 is chosen to reflect this light 139 as shown with arrows 151 onto a first surface (e.g., rear surface) of an RP screen 160, which functions as a rear projection surface to generate or provide a displayed image 166 on or through a second surface (e.g., a front surface) of the RP screen 160. The RP screen 160 is supported as shown at 161 by the vehicle attachment member 122 and, optionally and additionally, by the reflector support element 140 as shown at 162.

The reflector 150 may take many forms to practice the projection assembly 120. In some cases, the reflector 150 is chosen to be a wide angle reflector, e.g., a parabolic mirror or the like, to cause the projected light 139 to be reflected 151 through a wide angle onto a larger portion of the surface of the RP screen 160. In this way, a wide projection coverage for displayed image 166 is achieved with the assembly 120. In some embodiments, the reflector 150 is chosen to reflect light 151 onto about one third to one half or more of the first/rear surface of the RP screen 160. For example, the RP screen 160 may include a cylindrically-shaped sheet of mesh material (or other cross-sectional shape useful for enclosing the projector 130 and reflector 150), and the reflector 150 may reflect light 151 over an angle of 180 degrees so as to provide the displayed image 166 on about one half of the circumference of the RP screen 160. In other cases, the angle of coverage is greater such as 180 to 200 degrees or 200 to 270 degrees or even 270 to about 300 degrees.

The RP screen 160 may also take many forms to practice the projection assembly 120 of the present description. The RP screen 160 may take the form of a sheet (or flat, thin body) of material that is chosen to be light weight, to be porous to allow air flow through the screen as shown at 161, and to provide a certain opaqueness despite this porosity such that it functions as a rear-projection surface. To this end as shown in FIG. 1, the RP screen 160 may be designed based on a number of screen parameters or physical characteristics 170. For example, the RP screen 160 will have a particular shape 172 and size 174 that allow the UAV 110 to carry the projection assembly 120 as its payload without unduly affecting its aerodynamics. In some cases, the RP screen 160 will be a planar sheet (e.g., a rectangular sheet, a circular sheet, or other-shaped sheet). More often, though, the RP screen 160 will be configured to enclose a space or volume in which the projector 130 is positioned. In these cases, the shape 172 may be cylindrical, spherical, or tubular with a triangular, rectangular, or other-shaped cross section. The size 174 often will be selected to match or based on the size of the UAV 110, with an exemplary cylindrically-shaped RP screen 160 of one embodiment having a diameter in the range of 6 to 24 inches and a length of 12 to 36 inches.

The RP screen 160 is formed of a material 176 that is lightweight such as a fine mesh metal wire or a mesh of a plastic such as polypropylene. The material may be chosen to have a certain color to achieve other design parameters such as opaqueness 178, and, to this end, a plastic mesh may be chosen that is white, gray, or the like to further its use as a rear-projection surface. The screen 160 is also chosen to have a desired porosity and opaqueness 178 to allow a desired amount of airflow 165 through the material 176 of the screen 160 while providing a level of opacity that provides a displayed image 166 (on the front or second surface of the RP screen 160 when light 151 strikes the rear or first surface of the RP screen 160).

The desirable opacity may be achieved with a white plastic mesh with an open area or porosity in the range of 30 to 60 percent, more preferably in the range of 35 to 55 percent, and more preferably in the range of 40 to 50 percent. For example, the porosity may be defined with a mesh or screen of material with an open area of about 45 percent while the opacity needed is provided with this porosity and a wire/thread diameter in the range of 400 to 600 microns. In one embodiment, the RP screen 160 was formed of polypropylene mesh sheet that was opaque white with an 1190 micron mesh size, a 600 micron thread diameter, square openings, and an open area of 42 percent. In another embodiment, the same material was used with a 1000 micron mesh size, a 500 micron thread diameter, square openings, and an open area of 45 percent (e.g., 1 micron spacing).

Figure 2:
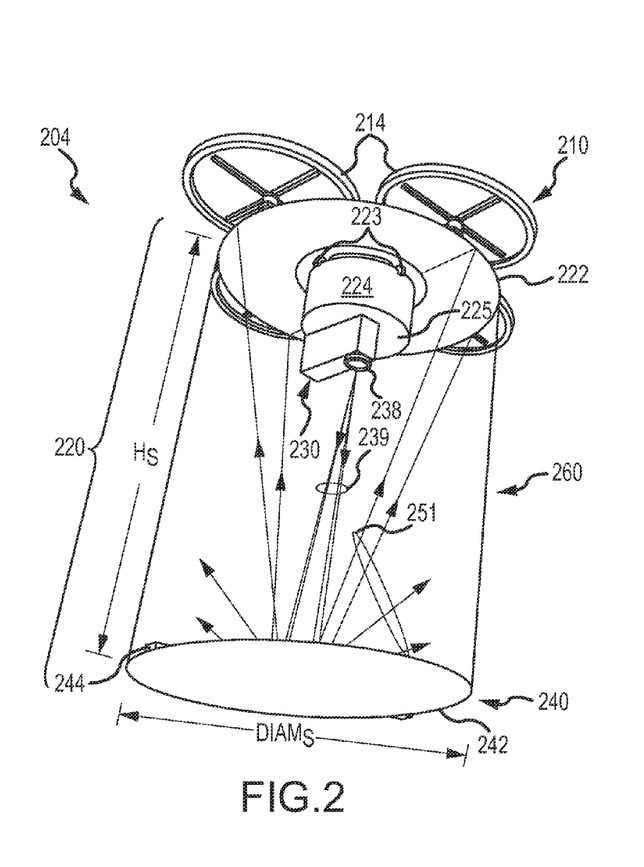
FIGS. 2 and 3 are bottom and top perspective views, respectively, of an embodiment of a projection assembly attached to a UAV (e.g., the projection assembly is the payload of a quadrotor) while a projector projects light onto a reflector and then an RP screen of the projection assembly, with the mesh or porous projection screen shown to be transparent or translucent to show the internal component of the projection assembly (e.g., the components enclosed within the volume defined by the cylindrical projection screen)
Figure 3:
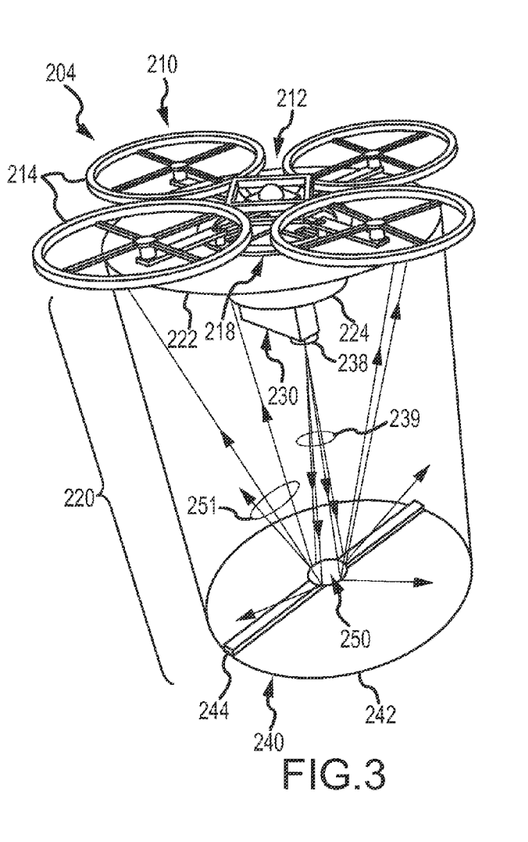

FIGS. 2 and 3 illustrate bottom and top perspective views, respectively, of a projection assembly 220 supported upon or mounted to a UAV 210. The UAV 210 in this embodiment is a multicopter with four rotors 214 (i.e., a quadrotor). The rotors 214 are supported off arms of the center frame/body 212, and the UAV 210 further includes a lower frame or landing skid(s) 218. The particular arrangement of the UAV 210 is not limiting to the present invention, with the non-limiting examples showing the payload of the projection assembly 220 being affixed to the lower frame/skids 218 but other configurations may attach to the center frame/body 212 in a different manner. Generally, though, the projection assembly 220 is mounted so as to provide a balanced payload such as with its center of mass on a line passing through the center of the UAV 210 (e.g., a center axis or line passing through the center of the rotors 214 may contain the center of mass of the projection assembly 210 which may have the center axis of the cylindrically shaped projection screen 260 coinciding with this center line).

More particularly, as shown, the projection assembly 220 includes a vehicle attachment member 222 such as a thin circular plate of opaque material to provide rigidity to the assembly 220 and hide a portion of the UAV 210 or a mesh or screen (e.g., a wire screen or porous frame) may be used to reduce weight. The vehicle attachment member 222 is affixed to the lower frame or skid 218 of the UAV 210 and a first end of a cylindrically-shaped RP screen 260 is affixed to the circumference of the member 222. The RP screen 260 extends from the first end to a second end that is affixed to a circumference of a lower support member 242, which may be a second opaque plate to block light 239 from the projector 230 from leaving the internal volume defined by the RP screen 260 or may be a mesh or screen element to limit weight (or may be eliminated in some cases).

The RP screen 260, as discussed with reference to FIG. 1, may take the form of a plastic mesh selected to be both porous and relatively opaque (e.g., a white mesh with 40 to 50 percent openings or the like). In FIGS. 2-5, the projection screens are illustrated as being transparent or at least translucent to allow the internal components of the projection assemblies to be seen, but the screens would typically be more solid in appearance (e.g., take the appearance of a white or other-colored screen or mesh basket or sheet). The RP screen 260 is shaped as a continuous or closed cylinder in this example with a height, $H_S$ (e.g., 10 to 36 inches or the like depending on the payload capacity of the UAV 210) and a diameter, $Diam_S$ (e.g., 6 to 18 inches or more again depending on the size and payload capacity of the UAV 210).

A reflector support beam or arm 244 is provided upon the lower support member 242, and/or, in some cases, the ends of the beam or arm 244 may be affixed to the second end of the cylindrically-shaped RP screen 260. A reflector 250 such as a wide angle reflector (e.g., a parabolic mirror) is attached to the support arm 244 in the center of the arm 244 and/or the center of the plate 242 (e.g., with a center axis of the cylindrically-shaped screen 260 passing through the center of the reflector 250). As shown, the size of the wide angle reflector 250 may be relatively small when compared with the diameter, $Diam_S$, to limit the weight of the projection assembly 220 while still obtaining good projection coverage of the rear (first or inner) surface of the projection screen 260. For example, the reflector 250 may be have an outer dimension (e.g., an outer diameter) that is one to several inches or may be provided as fraction of the screen diameter, $Diam_S$ (e.g., one fifth to one tenth in relative iameter).

As shown, the projection assembly 220 includes a projector support element 224 that is affixed with connectors or clips 223 to the lower surface of the vehicle attachment member 222. The projection assembly 220 further includes a projector 230 (e.g., a pico projector or the like) with an output lens 238 directed away from the UAV 210 and targeted onto (or focused onto) the reflector 250. This can be seen with light 239 from the projector outlet 238, such as light corresponding to playing a still or video image file with projector 230, being directed onto the reflector 250 (or its exposed reflective surface(s)). The reflector 250 is configured, such as with wide angle reflectance characteristics, to reflect the light as shown at 251 onto a first surface (rear or inner surface) of the projection screen 260.

In some cases, the light 251 is reflected through an angle of 180 to 200 degrees or more onto the RP screen 260 while other cases may provide coverage of the RP screen 260 of 270 to 300 degrees or the like (e.g., when a parabolic mirror is used for reflector 250). In other words, the reflector 250 can be selected and aligned with projector output lens 238 such that at least a portion of the rear surface along the screen's height, $H_S$, along about 180 to 300 degrees (or more) of the circumference to the cylindrically-shaped screen 260 are struck by light 251. In this example, the projector light 239 either strikes the reflector 250 where it is bounced back upward or skyward at an angle (within the space or volume of the cylinder provided by the screen 260) where it strikes the rear or first surface of the screen 260 or is blocked by the opaque support plate 242. The light 251 that strikes the rear or first surface of the screen 260 generates an image (still or video) on a front or second surface (opposite the rear or first surface) of the screen 260, and the displayed image on screen 260 can be viewed or seen by an audience or spectators positioned below the projection assembly 220 and the UAV 210 carrying the assembly 220 during flight.

Figure 4:
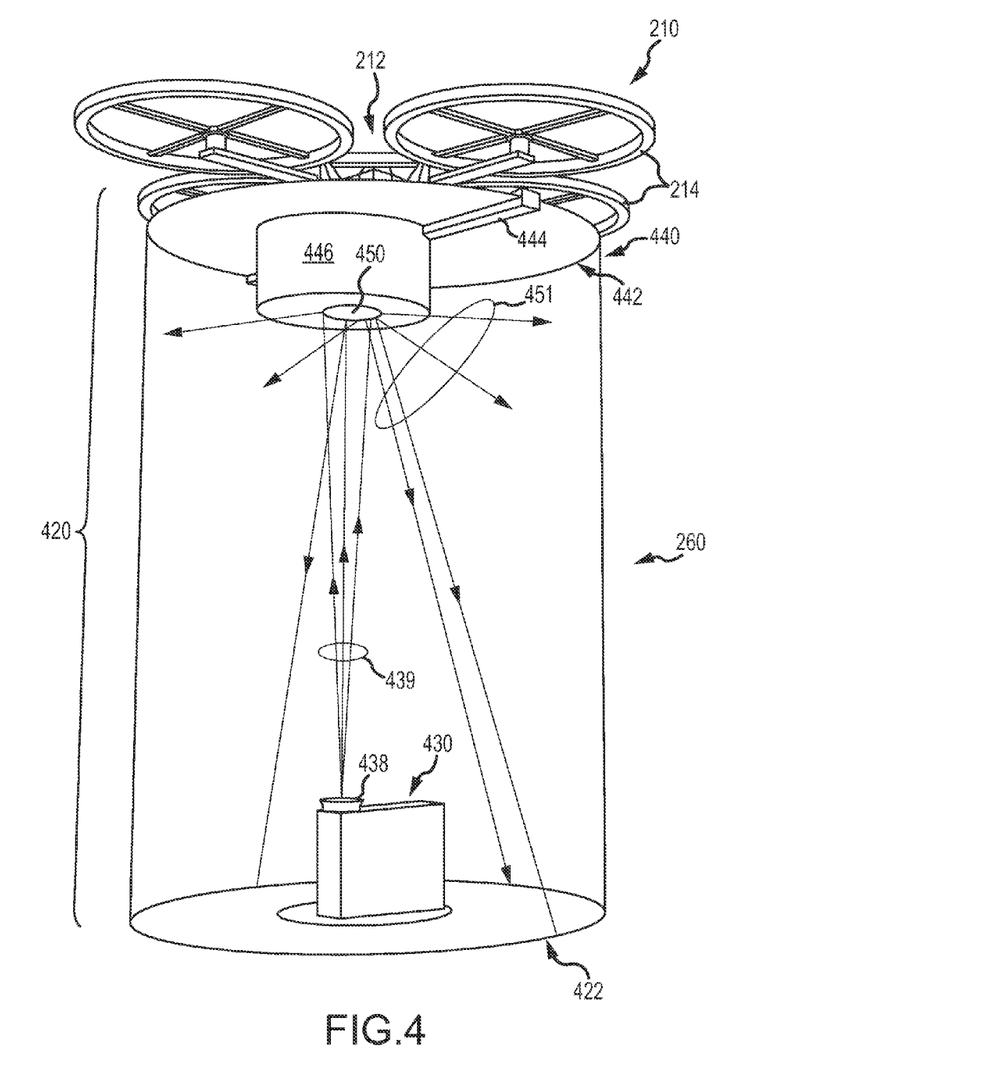
FIG. 4 is a side view, similar to those of FIGS. 2 and 3, showing another embodiment of a projection assembly supported beneath a UAV, with the projection screen again shown as being transparent-to-translucent to show the projector projecting light onto a reflector for redirection/reflection at a wide angle onto a rear (or inner or first) surface of a projection screen to create images on a front (or outer or second) surface of the projection screen.

FIG. 4 is a side view showing another embodiment of a projection assembly 420 supported beneath the UAV 210 (note that like components from FIGS. 2 and 3 are numbered consistently through FIGS. 2-5). Again, the projection screen 260 is shown as being transparent-to-translucent to show a projector 430 projecting light 439 onto a reflector 450 for redirection/reflection (as shown at 451) at a wide angle onto a rear (or inner or first) surface of the projection screen 260 to create images on a front (or outer or second) surface of the projection screen 260.

In the projection assembly 420, the projector 430 is supported by or mounted onto an inward facing or upper surface of projector support element 422. The support element 422 may take the form of a solid or porous/mesh plate (e.g., a thin sheet of black or other-colored plastic cut into a circle with the diameter of the cylindrically-shaped screen 260). The support element 422 is affixed about its periphery by an end of the projection screen 260 so that the projection screen 260 supports the support element 422 and the support element 422 functions to provide added rigidity to the screen 260 to assist in keeping its cylindrical shape during flight (e.g., while air is flowing through the screen 260).

The projector 430 is mounted on the support element 422 to be facing upward or toward the UAV 210. Particularly, the outlet lens 438 of the projector 430 is targeted vertically so that projected light (with still or video imagery) 439 generally follow a trajectory along the central axis of the cylinder formed by the projection screen 260 (or its side wall or its mesh material sheet) toward the body or center frame 212 of the UAV 210. The projection assembly 420 further includes a reflector 450 mounted upon a reflector support element 440 made up of a circular plate (solid or mesh sheet) 440 and a structural beam or arm 444 increasing the structural integrity of the plate 440. The arm 440 and/or the plate 440 are affixed to the center frame/body 212 (or a lower frame/skid 214 not shown in FIG. 4).

The support element 440 also includes a reflector stand 446 attached to the lower surface of the plate 440 (and, in some cases, the arm 444), and the reflector 450 is affixed to the lower and exposed surface of the reflector stand 446 such that its reflective surface(s) face toward the projector outlet lens 438. In some cases, the reflector 450 may be positioned with its center axis coinciding with the center axis of the cylindrical projection screen 260. As discussed with reference to FIGS. 2 and 3, the projection screen 260, the projector 430, and the reflector 450 (as well as support elements such as plate supports 422, 442) are arranged to facilitate flight of the UAV 210 with the projection assembly 420 as a payload such as by having the center of mass of these components or the overall center of mass of the assembly 420 being along the center axis of the UAV 210 (e.g., to hang directly below the center point of the frame or body 212). As shown, both the projector 430 and the reflector 450 are contained with the interior volume or space enclosed by the projection screen 260, which may be useful for disguising their presence in the assembly 420 to heighten the light-based illusion or effect provided by the UAV 210 and the operating projection assembly 420.

As shown, light 439 projected from the projector's outlet 438 is directed upward toward the UAV 210 and strikes the reflector 450 on the stand 446. The reflector 450, which may be a wide angle reflector such as a parabolic mirror or the like, reflects the light 451 onto a first or the inner surface of the projection screen 260. For example, the light 451 may strike 180 to 300 degrees of the cylindrically-shaped, first or inner surface of the projection screen 260. The projection screen 260, as discussed above, is formed of material(s) that allow it to behave as a rear-projection surface, with one embodiment using a sheet of lightweight, thin, and opaque material (e.g., white or other-colored plastic such as polypropylene or the like). In this manner, an image is provided on an outer or second surface of the projection screen 460 in response to the light 451 striking the opposite, inner or first surface of the screen 460. The material sheet is also porous or a mesh with a substantial amount of open space such as 40 to 60 percent to allow air to flow through the projection screen 460 to enhance aerodynamic flight of the UAV 210 while carrying the assembly 420.

Figure 5:
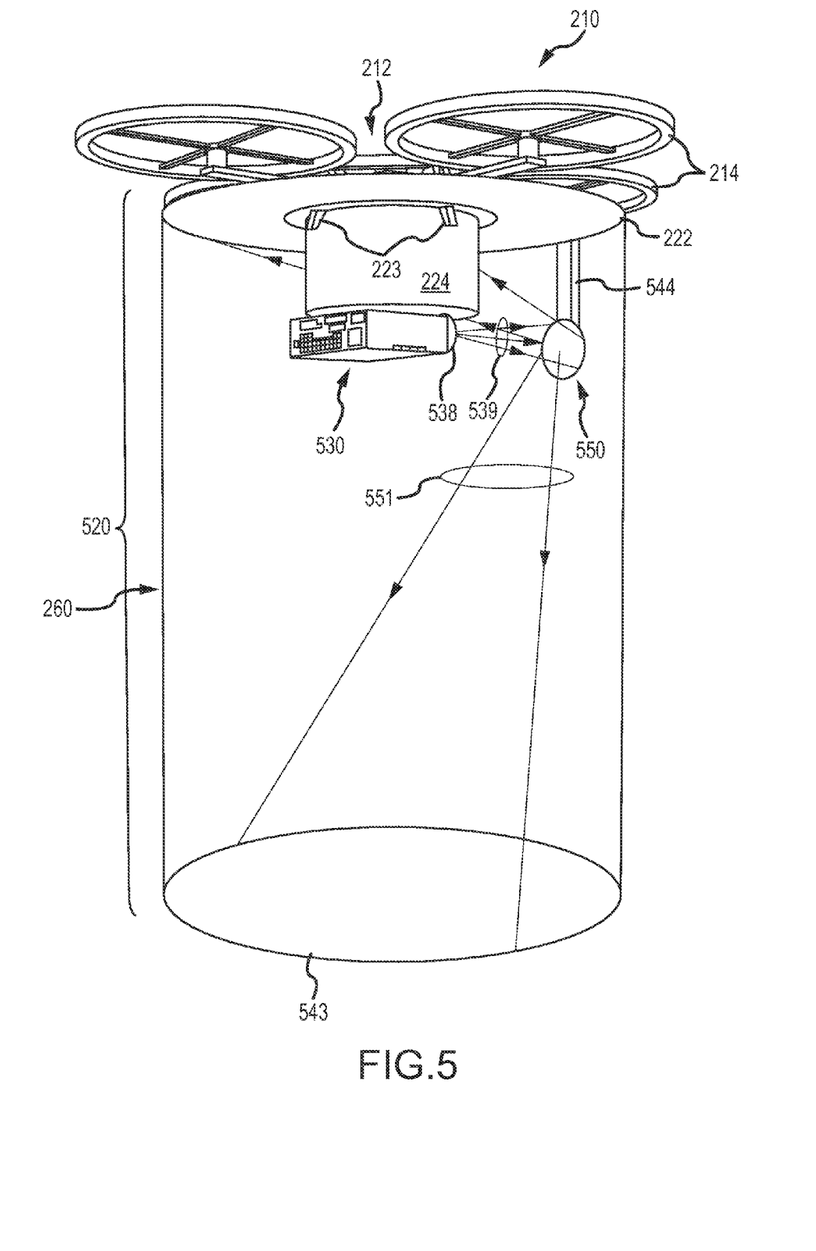
FIG. 5 is a bottom perspective view, similar to FIGS. 2-4, showing another embodiment of a projection assembly with the reflector positioned on or near the rear surface of the projection screen and with the projector mounted to project fully or more horizontally (relative to projectors of assemblies in FIGS. 2-4) onto the reflector.

FIG. 5 is a bottom perspective view showing another embodiment of a projection assembly 520 with a reflector 550 positioned on or near a first or rear surface (inward facing surface) of the projection screen 260 and with the projector 530 mounted to project fully or more horizontally (relative to projectors of assemblies in FIGS. 2-4) onto the reflector 550. As shown, the UAV 210 in the form of a quadrotor is used to carry the projection assembly 420 as a payload, and the vehicle attachment member 222 is affixed to the center frame/body 212 (or the lower frame not shown in FIG. 5). A projector support element 224 is attached to the member 222 via couplers or clips 223, and the projector 430 is attached to a lower surface of the projector support element or stand 224. Again, the projector 530 is positioned with its weight generally centered under the UAV 210 (or as desired to further the flight of the UAV 210), and the projector 530 may be a pico or small projector with batteries providing a life suited for the flying time of the UAV 210.

The projector 530 is mounted horizontally or as needed to project light 539 from its outlet lens 538 with a horizontal direction or a direction that is transverse or even orthogonal to the center axis of the cylindrically-shaped projection screen 260. In the assembly 520, a reflector 550, such as a wide angle reflector or mirror, is hung or positioned to receive the light 539 and to reflect the light 551 onto a wide range of the circumference or at a wide angle to illuminate fifty to eighty percent of the inner or rear surface(s) of the projection screen (e.g., about 180 to 300 degrees of the circumference of the cylinder formed by screen 260).

A screening element 543 may be affixed at an end of the screen 260 that is opaque to light to block light 551 that does not strike the screen 260 from escaping from the assembly 520 through an opening in the cylinder formed by the screen 260. The screening or light-blocking element 543 may be circular in shape and may be chosen to be lightweight but relatively rigid (e.g. a thin plastic sheet or plate) so as to also enhance the structural integrity of the cylindrically-shaped screen (e.g., to maintain the shape of the screen 260 when flying and when air is partially blocked by the material of the screen 260).

The reflector 550 may be mounted directly onto an inner surface of the screen 260 in some cases. Alternatively, as shown, the reflector 550 may be hung with a support arm 544, which is affixed to the vehicle attachment member 222, so as to be positioned on or proximate to the inner or rear surface of the screen 260 or so as to be spaced apart some desired distance (e.g., to float within the interior space defined by or enclosed by the screen 260). In some embodiments, the length of the arm 544 is chosen to place the center of the reflector 550 in line with the center of lens 538 of the projector 530 (e.g., such that the center of the reflector 550 and the center of outlet lens 538 are coplanar in a plane that is orthogonal to the center line of the cylinder formed by screen 260).

The size and shape of the reflector 550 may be varied to practice the assembly 520, but one embodiment uses a parabolic mirror with a diameter of 1 to 3 inches. The side hanging of the reflector 550 and arm 544 can be balanced by shifting the weight of the projector 530 a small amount off center as shown or, in some cases, a counterbalancing weight may be provided in the assembly 520 (such as a weight matching that of the reflector 550 and arm 544 provided on an opposite side of the screen 260 or, more preferably, on the vehicle attachment member 222).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A projection apparatus for use with an unmanned aerial vehicle (UAV), comprising:
    a projection screen with a rear surface and a front surface, wherein the projection screen has a level of opacity to function as a rear-projection surface;
    a vehicle attachment member adapted for coupling with a frame of the UAV, wherein the projection screen is supported at a first end by the vehicle attachment member and extends a distance from the first end to a second end spaced apart from the frame of the UAV; and
    a projector projecting light providing still or video images, wherein the projected light is directed onto the rear surface of the projection surface to generate a displayed image visible on the front surface of the projection screen.

2. The apparatus of claim 1, wherein the projection screen comprises a mesh sheet with a porosity allowing air to flow through the projection screen.

3. The apparatus of claim 2, wherein the mesh sheet is configured to have an open space of at least about 40 percent.

4. The apparatus of claim 3, wherein the open space of the sheet is in the range of 40 to 60 percent.

5. The apparatus of claim 2, wherein the mesh sheet comprises translucent-to-opaque plastic threads that provide the rear-projection surface function of the projection screen.

6. The apparatus of claim 5, wherein the plastic threads have a diameter in the range of 400 to 600 microns.

7. The apparatus of claim 1, further comprising a wide angle reflector spaced apart from the projector, wherein the projected light is focused onto the wide angle reflector and wherein the wide angle reflector reflects light onto the rear surface of the projection surface.

8. The apparatus of claim 7, wherein the projection screen is shaped to provide one or more sidewalls enclosing a space with the rear surface of the projection screen facing inward into the space and wherein the projector and the wide angle reflector are supported within the space.

9. The apparatus of claim 8, wherein the space has a cylindrical shape and wherein the reflected light from the wide angle reflector strikes at least 180 degrees of the rear surface.

10. The apparatus of claim 9, wherein the reflected light from the wide angle reflector strikes a portion of the rear surface in the range of 180 to 300 degrees.

11. The apparatus of claim 10, wherein the reflector comprises a parabolic mirror spaced apart from the projector and wherein the projector is supported and positioned such that the projected light is directed toward the UAV with the reflector disposed between the projector and the UAV, such that the projected light is directed away from the UAV with the reflector placed on a reflector support element affixed to the second end of the projection screen, or such that the projected light follows a trajectory that is transverse to a center line of the cylindrically-shaped space with the reflector positioned proximate to the rear surface of the projection screen.

12. A projection assembly for use with unmanned drones, comprising:
    a curved projection screen formed of a mesh material with an opacity allowing the curved projection screen to behave as a rear-projection surface;
    a projector operable to project, through an output lens, light associated with still or video images; and
    a reflector, spaced a distance apart from the output lens of the projector, wherein the projector is arranged relative to the reflector to direct the projected light onto the reflector and wherein the reflector is adapted to reflect the light over a wide angle onto a rear surface of the curved projection screen.

13. The assembly of claim 12, wherein the mesh material comprises plastic threads with open area of 40 to 60 percent.

14. The assembly of claim 13, wherein the plastic threads have a diameter in the range of 400 to 600 microns.

15. The assembly of claim 12, wherein the curved projection screen has a cylindrical shape with the rear surface facing toward an inner volume of the cylindrical shape.

16. The assembly of claim 15, wherein the reflector is configured to provide the reflected light onto at least 180 degrees of the rear surface of the cylindrically-shaped curved projection screen.

17. The assembly of claim 15, further comprising a support assembly including a vehicle attachment member for coupling the assembly to the body or frame of the unmanned drone and a screen member positioned over an opening of the cylindrically-shaped curved projection screen that is distal to the unmanned drone, wherein the screen member has a body that is substantially opaque to light.

18. The assembly of claim 17, wherein the support assembly further includes support elements adapted to: (a) support the projector such that the projected light is directed toward the unmanned drone with the reflector disposed between the projector and the unmanned drone; (b) support the projector such that the projected light is directed away from the unmanned drone with the reflector placed on the screen member that is affixed to an end of the cylindrically-shaped curved projection screen; or (c) support the projector such that the projected light follows a trajectory that is transverse to a center line of the cylindrically-shaped space with the reflector positioned proximate to the rear surface of the projection screen.

19. A display assembly, comprising:
a multicopter;
a tubular rear projection (RP) screen supported by an attachment member to a body of the multicopter;
a projector positioned within a spaced defined by an inner surface of the tubular RP screen; and
a reflector receiving light projected from the projector and reflecting the received light onto the inner surface of the tubular RP screen over at least 180 degrees of the tubular RP screen.

20. The display assembly of claim 19, wherein the reflector comprises a wide angle reflector and wherein the RP screen comprises a plastic mesh with an open area in the range of 40 to 60 percent.

* * * * *